(12) United States Patent
Ow et al.

(10) Patent No.: US 8,530,783 B2
(45) Date of Patent: Sep. 10, 2013

(54) LASER CUTTING SYSTEM

(75) Inventors: Rodney C. Ow, San Jose, CA (US); William E. Webler, San Jose, CA (US); Randolf Von Oepen, Los Altos, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 747 days.

(21) Appl. No.: 12/699,262

(22) Filed: Feb. 3, 2010

(65) Prior Publication Data
US 2010/0193482 A1 Aug. 5, 2010

Related U.S. Application Data

(60) Provisional application No. 61/149,655, filed on Feb. 3, 2009, provisional application No. 61/149,660, filed on Feb. 3, 2009.

(51) Int. Cl.
*B23K 26/14* (2006.01)

(52) U.S. Cl.
USPC .................................. 219/121.67; 219/121.86

(58) Field of Classification Search
CPC ............... B23K 26/14; B23K 26/1405; B23K 26/1447; B23K 26/1476; B23K 26/365; B23K 26/388
USPC .............. 219/121.6, 121.67, 121.68, 121.69, 219/121.7, 121.71, 121.72, 121.85, 121.86
See application file for complete search history.

(56) References Cited

U.S. PATENT DOCUMENTS

| 4,125,757 | A | * | 11/1978 | Ross .......................... 219/121.67 |
| 4,387,952 | A | | 6/1983 | Slusher |
| 4,694,139 | A | | 9/1987 | Roder |
| 4,729,766 | A | | 3/1988 | Bergentz et al. |
| 4,733,665 | A | | 3/1988 | Palmaz |
| 4,736,381 | A | | 4/1988 | Eden et al. |
| 4,893,972 | A | | 1/1990 | Blaho |
| 4,947,022 | A | | 8/1990 | Ostroff et al. |

(Continued)

FOREIGN PATENT DOCUMENTS

| EP | 0 221 570 A2 | 5/1987 |
| EP | 0 364 787 A1 | 4/1990 |

(Continued)

OTHER PUBLICATIONS

International Search Report issued by the European Patent Office on Aug. 7, 2010.

(Continued)

*Primary Examiner* — Khiem D Nguyen
(74) *Attorney, Agent, or Firm* — John K. Fitzgerald; Fulwider Patton LLP

(57) ABSTRACT

A laser cutting system including a chamber configured to provide a controlled environment while the laser is being used to cut a pattern into a material to reduce or eliminate heat and oxygen related changes to the mechanical characteristics of the material. A system for providing a gas to the controlled environment within the chamber, as well as a means for exhausting gas and cutting debris from the chamber is also described. A cutting mandrel that provides for flow of a shielding gas and also provides a means for dispersing a laser beam before it can produce unwanted damage to a section of tubing is also described.

6 Claims, 9 Drawing Sheets

(56) References Cited

U.S. PATENT DOCUMENTS

| | | | |
|---|---|---|---|
| 4,963,022 A | 10/1990 | Sommargren | |
| 4,994,071 A | 2/1991 | MacGregor | |
| 5,049,723 A | 9/1991 | MacDonald et al. | |
| 5,059,211 A | 10/1991 | Stack et al. | |
| 5,064,537 A | 11/1991 | Chupka et al. | |
| 5,073,694 A | 12/1991 | Tessier et al. | |
| 5,102,417 A | 4/1992 | Palmaz | |
| 5,160,823 A | 11/1992 | Bennin et al. | |
| 5,169,678 A | 12/1992 | Cole et al. | |
| 5,222,617 A | 6/1993 | Gregory et al. | |
| 5,306,286 A | 4/1994 | Stack et al. | |
| 5,345,057 A * | 9/1994 | Muller | 219/121.71 |
| 5,356,423 A | 10/1994 | Tihoix et al. | |
| 5,421,955 A | 6/1995 | Lau et al. | |
| 5,514,154 A | 5/1996 | Lau et al. | |
| 5,521,374 A | 5/1996 | Cray et al. | |
| 5,569,295 A | 10/1996 | Lam | |
| 5,591,197 A | 1/1997 | Orth et al. | |
| 5,603,722 A | 2/1997 | Phan et al. | |
| 5,605,696 A | 2/1997 | Eury et al. | |
| 5,611,946 A | 3/1997 | Leong et al. | |
| 5,656,186 A | 8/1997 | Mourou et al. | |
| 5,720,894 A | 2/1998 | Neev et al. | |
| 5,759,192 A | 6/1998 | Saunders | |
| 5,780,807 A | 7/1998 | Saunders | |
| 5,824,049 A | 10/1998 | Ragheb et al. | |
| 5,854,805 A | 12/1998 | Reid et al. | |
| 5,948,596 A | 9/1999 | Zhong et al. | |
| 6,131,266 A | 10/2000 | Saunders | |
| 6,160,240 A | 12/2000 | Momma et al. | |
| 6,208,458 B1 | 3/2001 | Galvanauskas et al. | |
| 6,214,115 B1 | 4/2001 | Taylor et al. | |
| 6,229,829 B1 | 5/2001 | Yin | |
| 6,245,103 B1 | 6/2001 | Stinson | |
| 6,248,129 B1 | 6/2001 | Froix | |
| 6,254,632 B1 | 7/2001 | Wu et al. | |
| 6,281,262 B1 | 8/2001 | Shikinami | |
| 6,324,195 B1 | 11/2001 | Suzuki et al. | |
| RE37,585 E | 3/2002 | Mourou et al. | |
| 6,369,355 B1 | 4/2002 | Saunders | |
| 6,395,326 B1 | 5/2002 | Castro et al. | |
| 6,411,636 B1 | 6/2002 | Ota et al. | |
| 6,423,085 B1 | 7/2002 | Murayama et al. | |
| 6,423,092 B2 | 7/2002 | Datta et al. | |
| 6,489,589 B1 | 12/2002 | Alexander | |
| 6,517,888 B1 | 2/2003 | Weber | |
| 6,517,889 B1 | 2/2003 | Jayaraman | |
| 6,521,865 B1 | 2/2003 | Jones et al. | |
| 6,531,679 B2 | 3/2003 | Heerman et al. | |
| 6,537,480 B1 | 3/2003 | Becker et al. | |
| 6,558,733 B1 | 5/2003 | Hossainy et al. | |
| 6,626,939 B1 | 9/2003 | Burnside et al. | |
| 6,641,607 B1 | 11/2003 | Hossainy et al. | |
| 6,643,426 B1 | 11/2003 | Alvarado et al. | |
| 6,719,334 B1 | 4/2004 | Stinson | |
| 6,878,901 B2 | 4/2005 | Johnson et al. | |
| 6,927,359 B2 | 8/2005 | Kleine et al. | |
| 7,077,859 B2 | 7/2006 | Sirhan et al. | |
| 2002/0082679 A1 | 6/2002 | Sirhan et al. | |
| 2002/0082685 A1 | 6/2002 | Sirhan et al. | |
| 2002/0198589 A1 | 12/2002 | Leong | |
| 2003/0050692 A1 | 3/2003 | Sirhan et al. | |
| 2003/0052101 A1 | 3/2003 | Gu et al. | |
| 2003/0139801 A1 | 7/2003 | Sirhan et al. | |
| 2004/0059408 A1 | 3/2004 | Alvarado et al. | |
| 2004/0127970 A1 | 7/2004 | Saunders et al. | |
| 2004/0226922 A1 | 11/2004 | Flanagan | |
| 2004/0230290 A1 | 11/2004 | Weber et al. | |
| 2005/0033412 A1 | 2/2005 | Wu et al. | |
| 2005/0035101 A1 | 2/2005 | Jones et al. | |
| 2005/0070996 A1 | 3/2005 | Dinh et al. | |
| 2005/0087520 A1 | 4/2005 | Wang et al. | |
| 2006/0033240 A1 | 2/2006 | Weber et al. | |
| 2006/0041102 A1 | 2/2006 | Hossainy et al. | |
| 2006/0054604 A1 | 3/2006 | Saunders | |
| 2007/0012669 A1 * | 1/2007 | Mori et al. | 219/121.84 |
| 2008/0269870 A1 | 10/2008 | Ruuttu et al. | |
| 2009/0314753 A1 * | 12/2009 | Kosmowski | 219/121.72 |

FOREIGN PATENT DOCUMENTS

| | | |
|---|---|---|
| EP | 0 372 789 A3 | 6/1990 |
| EP | 0 421 729 A2 | 4/1991 |
| EP | 0 540 290 A2 | 5/1993 |
| EP | 0 541 443 A1 | 5/1993 |
| EP | 0 562 150 A1 | 9/1993 |
| EP | 0 624 421 A2 | 11/1994 |
| EP | 0 662 307 A1 | 7/1995 |
| EP | 0 679 373 A2 | 11/1995 |
| EP | 0 714 641 A2 | 6/1996 |
| EP | 1 466 634 A1 | 10/2004 |
| GB | 2 070 490 A | 9/1981 |
| JP | 61169188 | 7/1986 |
| JP | 5-285898 | 11/1993 |
| WO | 92/06734 | 4/1992 |
| WO | 0230328 A1 | 4/2002 |
| WO | 2006056639 A1 | 6/2006 |

OTHER PUBLICATIONS

C.H. Fan et al., "Plasma Absorption of Femtosecond Laser Pulses in Dielectrics," Journal of Heat Transfer, Apr. 2002, vol. 124, pp. 275-283.

Brochure: Industrial Strength Laser Marking: Turning Photonix into Dollars, printed by Excel/Control Laser, Inc., (2002).

J.Sun et al., "Inert gas beam delivery for ultrafast laser micromachining at ambient pressure," Journal of Applied Physics, Jun. 13, 2001, vol. 89, No. 12, pp. 8219-8224.

* cited by examiner

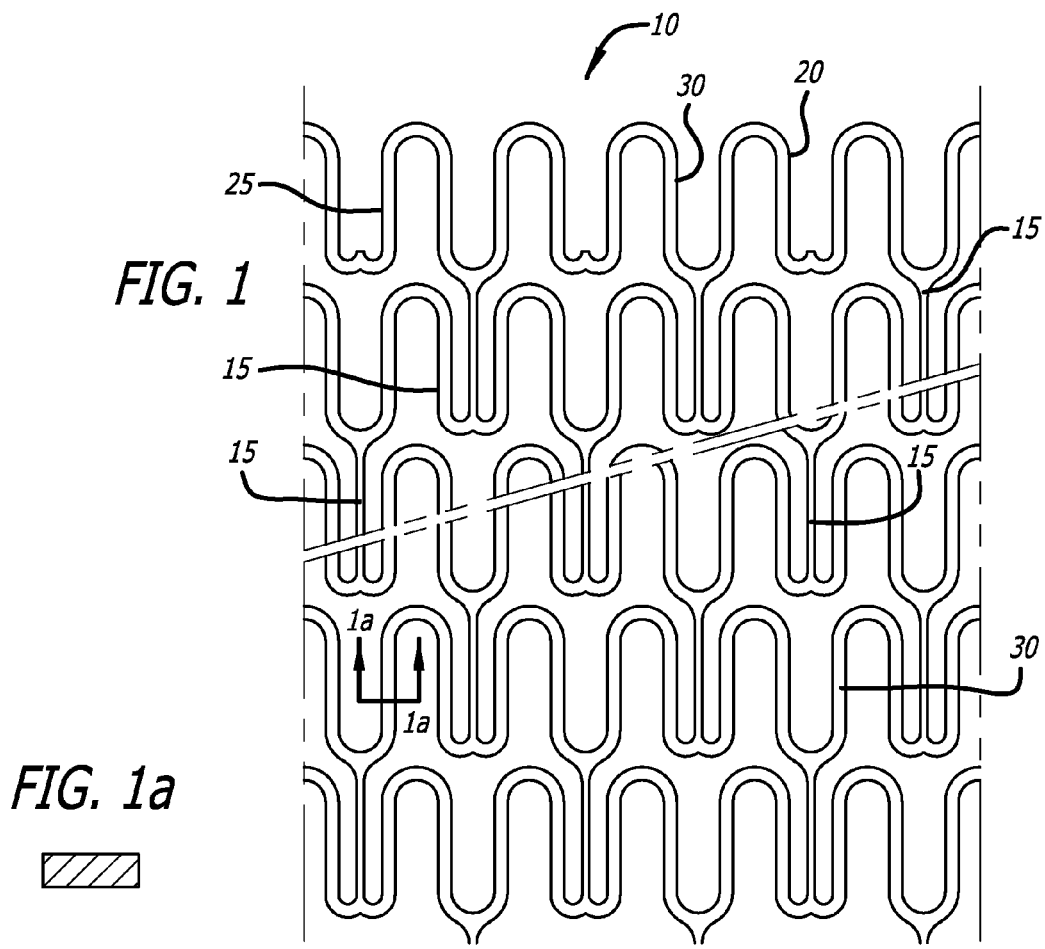
FIG. 1
FIG. 1a
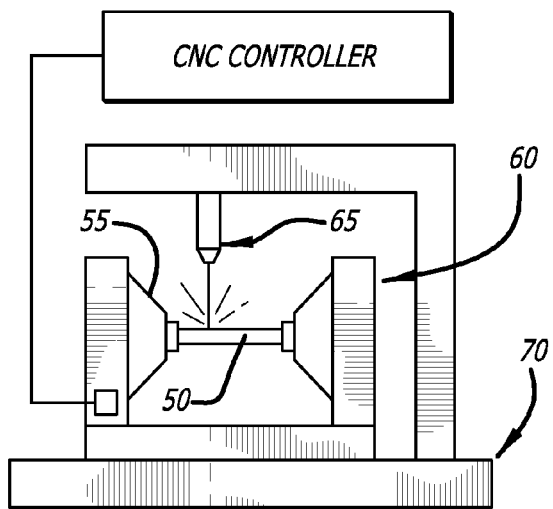
FIG. 2

LASER CUTTING SYSTEM

CROSS-REFERENCES TO RELATED APPLICATIONS

This application claims priority from U.S. Provisional Application No. 61/149,655, filed Feb. 3, 2009 and U.S. Provisional Application No. 61/149,660, filed Feb. 3, 2009 incorporated by reference in its entirety.

This application is also related to U.S. application Ser. No. 12/699,336 entitled IMPROVED LASER CUTTING PROCESS FOR FORMING STENTS, filed Feb. 3, 2010, and U.S. application Ser. No. 12/699,391 entitled MULTIPLE BEAM LASER SYSTEM FOR FORMING STENTS, filed Feb. 3, 2010.

BACKGROUND

1. Field of the Invention

The present invention relates generally to implantable medical devices and to a method for manufacturing implantable medical devices. These implantable medical devices may also be capable of retaining therapeutic materials and dispensing the therapeutic materials to a desired location of a patient's body. More particularly, the present invention relates to a method for forming the structure of a stent or intravascular or intraductal medical device.

2. General Background and State of the Art

In a typical percutaneous transluminal coronary angioplasty (PTCA) for compressing lesion plaque against the artery wall to dilate the artery lumen, a guiding catheter is percutaneously introduced into the cardiovascular system of a patient through the brachial or femoral arteries and advanced through the vasculature until the distal end is in the ostium. A dilatation catheter having a balloon on the distal end is introduced through the catheter. The catheter is first advanced into the patient's coronary vasculature until the dilatation balloon is properly positioned across the lesion.

Once in position across the lesion, a flexible, expandable, preformed balloon is inflated to a predetermined size at relatively high pressures to radially compress the atherosclerotic plaque of the lesion against the inside of the artery wall and thereby dilate the lumen of the artery. The balloon is then deflated to a small profile, so that the dilatation catheter can be withdrawn from the patient's vasculature and blood flow resumed through the dilated artery. While this procedure is typical, it is not the only method used in angioplasty.

In angioplasty procedures of the kind referenced above, restenosis of the artery often develops which may require another angioplasty procedure, a surgical bypass operation, or some method of repairing or strengthening the area. To reduce the likelihood of the development of restenosis and strengthen the area, a physician can implant an intravascular prosthesis, typically called a stent, for maintaining vascular patency. In general, stents are small, cylindrical devices whose structure serves to create or maintain an unobstructed opening within a lumen. The stents are typically made of, for example, stainless steel, nitinol, or other materials and are delivered to the target site via a balloon catheter. Although the stents are effective in opening the stenotic lumen, the foreign material and structure of the stents themselves may exacerbate the occurrence of restenosis or thrombosis.

A variety of devices are known in the art for use as stents, including expandable tubular members, in a variety of patterns, that are able to be crimped onto a balloon catheter, and expanded after being positioned intraluminally on the balloon catheter, and that retain their expanded form. Typically, the stent is loaded and crimped onto the balloon portion of the catheter, and advanced to a location inside the artery at the lesion. The stent is then expanded to a larger diameter, by the balloon portion of the catheter, to implant the stent in the artery at the lesion. Typical stents and stent delivery systems are more fully disclosed in U.S. Pat. No. 5,514,154 (Lau et al.), U.S. Pat. No. 5,507,768 (Lau et al.), and U.S. Pat. No. 5,569,295 (Lam et al.).

Stents are commonly designed for long-term implantation within the body lumen. Some stents are designed for non-permanent implantation within the body lumen. By way of example, several stent devices and methods can be found in commonly assigned and common owned U.S. Pat. No. 5,002,560 (Machold et al.), U.S. Pat. No. 5,180,368 (Garrison), and U.S. Pat. No. 5,263,963 (Garrison et al.).

Intravascular or intraductal implantation of a stent generally involves advancing the stent on a balloon catheter or a similar device to the designated vessel/duct site, properly positioning the stent at the vessel/duct site, and deploying the stent by inflating the balloon which then expands the stent radially against the wall of the vessel/duct. Proper positioning of the stent requires precise placement of the stent at the vessel/duct site to be treated. Visualizing the position and expansion of the stent within a vessel/duct area is usually done using a fluoroscopic or x-ray imaging system.

Although PTCA and related procedures aid in alleviating intraluminal constrictions, such constrictions or blockages reoccur in many cases. The cause of these recurring obstructions, termed restenosis, is due to the body's immune system responding to the trauma of the surgical procedure. As a result, the PTCA procedure may need to be repeated to repair the damaged lumen.

In addition to providing physical support to passageways, stents are also used to carry therapeutic substances for local delivery of the substances to the damaged vasculature. For example, anticoagulants, antiplatelets, and cytostatic agents are substances commonly delivered from stents and are used to prevent thrombosis of the coronary lumen, to inhibit development of restenosis, and to reduce post-angioplasty proliferation of the vascular tissue, respectively. The therapeutic substances are typically either impregnated into the stent or carried in a polymer that coats the stent. The therapeutic substances are released from the stent or polymer once it has been implanted in the vessel.

In the past, stents have been manufactured in a variety of manners, including cutting a pattern into a tube that is then finished to form the stent. The pattern can be cut into the tube using various methods known in the art, including using a laser.

Laser cutting of the stent pattern initially utilized lasers such as the Nd:YAG laser, configured either at its fundamental mode and frequency, or where the frequency of the laser light was doubled, tripled, or even quadrupled to give a light beam having a desired characteristic to ensure faster and cleaner cuts.

Recently, lasers other than conventional Nd:YAG lasers have been used, such as diode-pumped solid-state lasers that operate in the short pulse pico-second and femto-second domains. These lasers provide improved cutting accuracy, but cut more slowly than conventional lasers such as the long pulse Nd:YAG laser.

Throughout the process of fabricating a stent implant from raw tubing there is a general desire to minimize the amount of contamination in non-beneficial materials affects that can result from the introduction of high heat and formed substances to the tubing. One process that is particularly susceptible to these affects is the laser cutting process, since it introduces both heat in the form of laser energy and foreign materials in the form of shielding gases and surrounding environmental gases into the stent cutting process. Oxygen is a particular concern because it can lead to material oxidation and embrittlement of the material due to reactions between the oxygen and the tubing material in the presence of the heat generated by the laser-cutting beam.

A further concern is the affect of molten stent material and ablated debris generated during the laser cutting process. As tubing is melted or ablated by the laser beam to form a stent structure, the shielding gas, which is typically an inert gas such as argon, directs molten material away from the raw tubing. At least a portion of this material is ejected in a direction that generally opposes the direction of the laser beam. Under certain conditions, such as when the shielding gas is flowing at a low rate, or when the shielding gas nozzle is wide enough to allow entry of particulates, the laser optics can become marred by the escaping particulates. The particulates may deposit on the lens of the laser equipment and over time, these depositions can obscure the path of the laser beam creating detrimental changes the laser beam characteristics. For example, the beam may lose focus, which can result in a less clean cut or longer cutting times. Another concern is the debris from laser cutting may be accumulated inside the cutting kerf, thereby reducing the cutting efficiency of the laser beam.

Another problem with using a laser to cut a stent pattern into a tube is that to ensure that a laser will cut the tubing used to form stents, there must be appropriate laser power to melt or ablate the tubing material. However, when the laser cuts through the tubing, the laser beam may propagate beyond the tubing wall and may melt or burn the opposing wall of the tubing material. This may cause defects in the stent pattern which is ultimately cut from the opposing wall of the tubing.

What has been needed, and heretofore unavailable, is an efficient and cost-effective laser cutting system that incorporates various features designed to enhance the cutting performance of the laser while protecting both the laser and the manufactured article from detrimental effects due to the presence of an undesired environmental gas, such as oxygen and damage to the laser optics and article due to particulates generated from the material being cut. Such a system and method would also provide for preventing material and laser optic contamination throughout the laser cutting process by ensuring that molten and material and ablated debris other resultant substances are optimally withdrawn from the cutting zone of the laser cutting equipment. Further, such a system should be capable of cutting a stent pattern into a tubing wall while avoiding damage to the opposing wall of the tubing. The present invention satisfies these, and other needs.

SUMMARY OF THE INVENTION

In its broadest aspect, the present invention includes a laser cutting system having a chamber configured to provide a controlled environment while the laser is being used to cut a pattern into a material to reduce or eliminate heat and oxygen related changes to the mechanical characteristics of the material. The chamber includes means for providing a gas to the controlled environment within the chamber, as well as a means for exhausting gas and cutting debris from the chamber.

In another aspect, the mean for exhausting gas and cutting debris from the chamber includes a vacuum nozzle in communication with an exhaust port. Debris caused by the cutting action of the laser on the material is aspirated from the cutting area which is located within an area capable of being aspirated by a vacuum applied to the vacuum nozzle.

In still another aspect, the laser is directed through a laser nozzle to cut the material, and the laser nozzle is disposed within the vacuum nozzle such that a channel is formed between an outer surface of the laser nozzle and the inner surface of the vacuum nozzle, the channel being in fluid communication with a port to which a vacuum may be applied.

In yet another aspect, a distal tip of the vacuum nozzle closest to the material being cut may be shaped to generally conform to the shape of the material being cut so as to provide from improved aspiration of cutting debris resulting from the laser cutting of the material.

In a further aspect, the present invention includes a laser cutting system, comprising: a laser source for providing a laser beam; a chamber for maintaining a controlled environment, the chamber having an optical element disposed in one surface of the chamber for allowing access by the laser beam to an internal volume of the chamber, the chamber also having an input port and an exhaust port; and a fixture for holding articles to be cut by the laser beam disposed within the chamber.

In a still further aspect, the present invention includes a vacuum nozzle disposed adjacent the fixture and in fluid communication with the exhaust port.

In yet another aspect, a laser nozzle through which the laser beam shines to fall upon an article held by the fixture is provided, the laser nozzle being disposed within the vacuum nozzle such that a channel if formed between an outer surface of the laser nozzle and an inner surface of the vacuum nozzle, the channel in fluid communication with the exhaust port.

In still another aspect, the vacuum nozzle includes a recess configured to surround a portion of a tube from which a stent pattern will be cut. In yet another aspect, the recess has a semi-circular shape. In still another aspect, the chamber is defined by a fixed tray and a movable tray, the movable tray having an open position and a closed position, the chamber effective to form a closed volume when the movable tray is in the closed position. In a further aspect, the input port is configured to receive a shielding gas, and in still another aspect, the invention also includes a vacuum source in fluid communication with the exhaust port.

In still another aspect, the present invention includes a cutting mandrel that provides for flow of a shielding gas and also provides a means for dispersing, scattering, or diffusing a laser beam before it can produce unwanted damage to a section of tubing. The various aspects of the cutting mandrel above are advantageous in that they provide for diffraction or dispersion of a laser beam that prevents the beam from melting or otherwise damaging the inner surface of tubing used to form a stent.

In another aspect, channels formed within the cutting mandrel allow for the introduction of a shield gas within the inner diameter of a length of tubing used to form a stent and may reduce material embrittlement, material oxidation, or other undesired effects due to stent material heating and/or exposure to certain gases. In other aspects, introduction of a shielding gas may also be used to assist in maintaining the optical clarity of the dispersion element and keep the channels clean and free from particulate and other matter that is generated during the laser cutting process.

In still another aspect, a close fit between the cutting mandrel and the inner wall of the tube being cut into a stent may compensate for a lack of tube straightness and thus improve laser cutting efficiency and stent strut dimensional control.

In still another aspect, the present invention includes a cutting mandrel for use while cutting a stent pattern into a tube with a laser, comprising a mandrel having a proximal end and a distal end; a first bore extending from a top surface of the mandrel through a bottom surface of the mandrel, the bore located adjacent the distal end of the mandrel, the bore having a first opening on the top surface defining an exhaust port, and a second opening on the bottom surface of the mandrel; a second bore extending axially within the mandrel from the proximal end of the mandrel and intersecting with the first bore; and a dispersion element disposed within the second opening of the first bore.

In yet another aspect, the present invention includes a recess extending from a location proximal to the second opening to the distal end of the mandrel. In another aspect, the recess is formed in a side of the mandrel farthest from the wall of a tube that is being cut by a laser beam. In still another aspect the recess is formed in a side of the mandrel nearest to the wall of a tube that is being cut by a laser beam.

In still another aspect, an opening disposed at the proximal end of the second bore is configured to receive a shielding gas.

In still another aspect, the invention includes a dispersion element disposed within the second opening of the first bore of the mandrel. In yet another aspect, the dispersion element is a lens.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a partial view of a stent showing various elements of a stent pattern.

FIG. 1a is a cross-sectional view of a portion of one of the elements of the stent pattern.

FIG. 2 is a side view of a typical arrangement of a computer controlled cutting station for cutting stent patterns into suitable tubing using a laser beam.

DETAILED DESCRIPTION OF THE PREFERRED EMBODIMENTS

Figure 3:
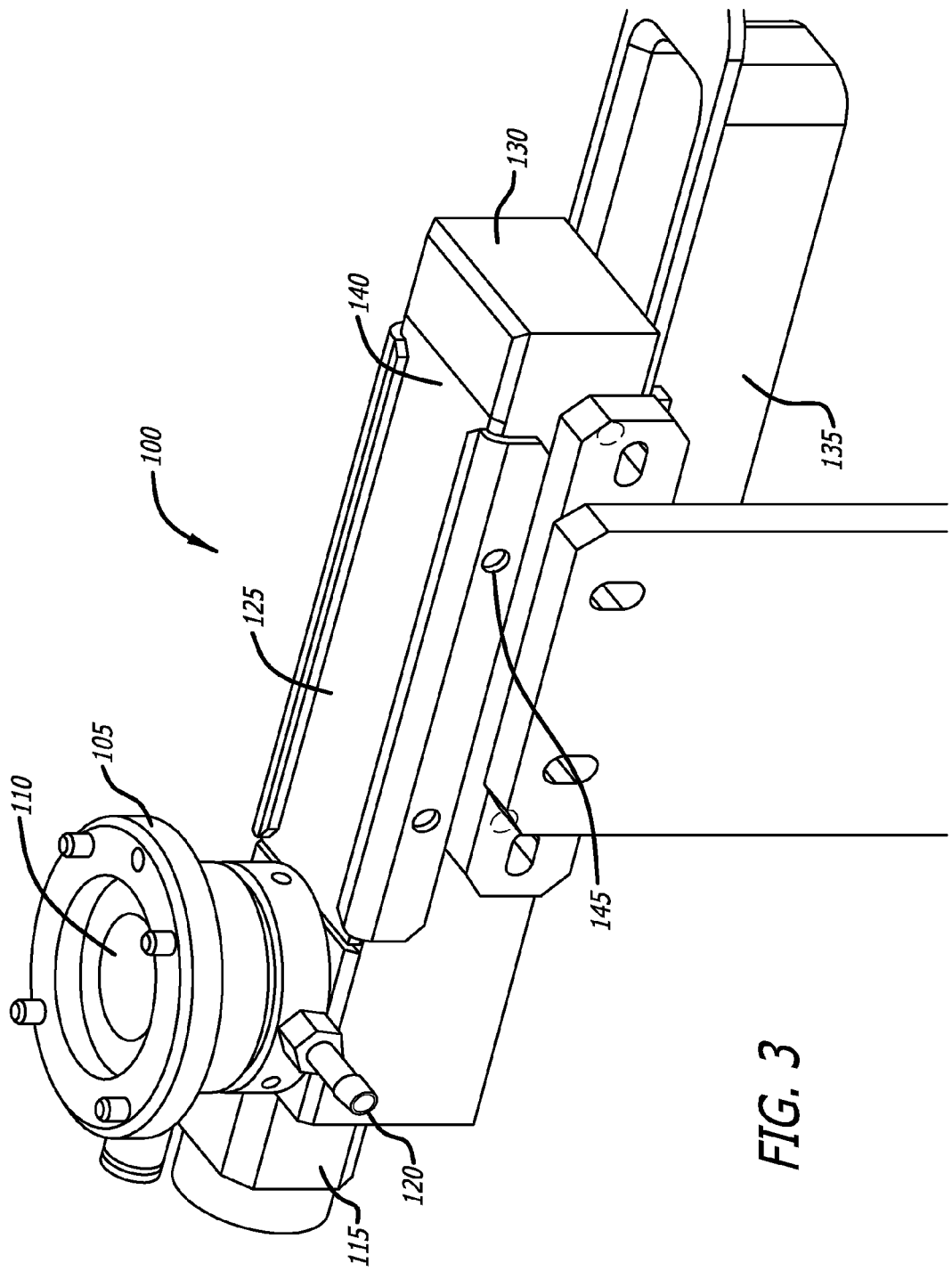
FIG. 3 is a perspective view of one embodiment of a laser cutting station incorporating various aspects of the present invention.

FIG. 1 is an enlarged perspective view of a stent 10 illustrating an exemplary stent pattern and showing the placement of interconnecting elements 15 between adjacent radially expandable cylindrical elements. Each pair of the interconnecting elements 15 on one side of a cylindrical element are preferably placed to achieve maximum flexibility for a stent. In the embodiment shown in FIG. 1, the stent 10 has three interconnecting elements 15 between adjacent radially expandable cylindrical elements which are 120 degrees apart. Each pair of interconnecting elements 15 on one side of a cylindrical element are offset radially 60 degrees from the pair on the other side of the cylindrical element. The alternation of the interconnecting elements results in a stent which is longitudinally flexible in essentially all directions. Various configurations for the placement of interconnecting elements are possible. However, as previously mentioned, all of the interconnecting elements of an individual stent should be secured to either the peaks or valleys of the undulating structural elements in order to prevent shortening of the stent during the expansion thereof.

The number of undulations may also be varied to accommodate placement of interconnecting elements 15, for example, at the peaks of the undulations or along the sides of the undulations as shown in FIG. 1.

As best observed in FIG. 1, cylindrical elements in this exemplary embodiment are shown in the form of a serpentine pattern. As previously mentioned, each cylindrical element is connected by interconnecting elements 15. The serpentine pattern is made up of a plurality of U-shaped members 20, W-shaped members 25, and Y-shaped members 30, each having a different radius so that expansion forces are more evenly distributed over the various members.

The afore-described illustrative stent 10 and similar stent structures can be made in many ways. However, the preferred method of making the stent is to cut a thin-walled tubular member, such as, for example, stainless steel tubing to remove portions of the tubing in the desired pattern for the stent, leaving relatively untouched the portions of the metallic tubing which are to form the stent. In accordance with the invention, it is preferred to cut the tubing in the desired pattern by means of a machine-controlled laser, as exemplified schematically in FIG. 2.

The tubing may be made of suitable biocompatible material such as, for example, stainless steel. The stainless steel tube may be Alloy type: 316L SS, Special Chemistry per ASTM F138-92 or ASTM F139-92 grade 2. Special Chemistry of type 316L per ASTM F138-92 or ASTM F139-92 Stainless Steel for Surgical Implants. Other biomaterials may also be used, such as various biocompatible polymers, co-polymers or suitable metals, alloys or composites that are capable of being cut by a laser.

Another example of materials that can be used for forming stents is disclosed within U.S. application Ser. No. 12/070,646, the subject matter of which is intended to be incorporated herein in its entirety, which application discloses a high strength, low modulus metal alloy comprising the following elements: (a) between about 0.1 and 70 weight percent Niobium, (b) between about 0.1 and 30 weight percent in total of at least one element selected from the group consisting of Tungsten, Zirconium and Molybdenum, (c) up to 5 weight percent in total of at least one element selected from the group consisting of Hafnium, Rhenium and Lanthanides, in particular Cerium, (d) and a balance of Tantalum The alloy provides for a uniform beta structure, which is uniform and corrosion resistant, and has the ability for conversion oxidation or nitridization surface hardening of a medical implant or device formed from the alloy. The tungsten content of such an alloy is preferably between 0.1 and 15 weight percent, the zirconium content is preferably between 0.1 and 10 weight percent, The molybdenum content is preferably between 0.1 and 20 weight percent and the niobium content is preferably between 5 and 25 weight percent.

The stent diameter is very small, so the tubing from which it is made must necessarily also have a small diameter. Typically the stent has an outer diameter on the order of about 0.06 inch in the unexpanded condition, the same outer diameter of the tubing from which it is made, and can be expanded to an outer diameter of 0.1 inch or more. The wall thickness of the tubing is about 0.003 inch or less.

Referring now to FIG. 2, the tubing 50 is put in a rotatable collet fixture 55 of a machine-controlled apparatus 60 for positioning the tubing 50 relative to a laser 65. According to machine-encoded instructions, the tubing 50 is rotated and moved longitudinally relative to the laser 65 which is also machine-controlled. The laser selectively removes the material from the tubing and a pattern is cut into the tube. The tube is therefore cut into the discrete pattern of the finished stent.

The process of cutting a pattern for the stent into the tubing is automated except for loading and unloading the length of tubing. Referring again to FIG. 2, it may be done, for example, using a CNC-opposing collet fixture 55 for axial rotation of the length of tubing, in conjunction with a CNC X/Y table 70 to move the length of tubing axially relatively to a machine-controlled laser as described. Alternatively, the collet fixture may hold the tube at only one end, leaving the opposite end unsupported. The entire space between collets can be patterned using the laser. The program for control of the apparatus is dependent on the particular configuration used and the pattern to be cut by the laser.

Referring now to FIG. 3, an exemplary embodiment of a laser cutting station 100 is shown. Laser cutting station 100 has a laser head assembly 105 through which a laser may enter the cutting zone through laser entry 110. Disposed at one end of the laser cutting station 100 is a tubing collet assembly 115. Tubing collet assembly 115 is configured to hold a length of tubing for cutting by a laser entering the laser head assembly 105 through laser entry 110. Additional details of the arrangement of the tubing collet assembly and the laser head assembly will be discussed below. Also visible in FIG. 3 is a vacuum port 120. This vacuum port extends into the cutting zone and is useful in removing debris as the laser cuts the tube.

Laser cutting station 100 also includes a shielding chamber 125 that maintains a controlled environment around the stent tubing that is low in oxygen. Maintaining a low oxygen environment results in a reduction in material embrittlement caused by the interaction of the laser and oxygen in the atmosphere with the tubing material. Use of a shielding chamber 125, such as that depicted in FIG. 3, is advantageous over existing stent cutting equipment in that the shielding gas protects not only the external surface of the tubing from oxygen embrittlement while it is being cut by the laser, but it also protects the inner surface of the stent tubing.

In a presently preferred embodiment, shielding chamber 125 comprises an upper tray 130 that is fixedly coupled to the laser head assembly 105 and lower tray 135 that is movable relative to the upper tray 130. Lower tray 135 is depicted in FIG. 3 as being partially removed from the laser cutting equipment in order to expose and retrieve cut stent parts that may have fallen into the lower tray during the stent cutting process. In normal operation lower tray 135 would be fully engaged with upper tray 130 of the shielding chamber 125, thereby maintaining an enclosed chamber around the stent tubing to maintain a controlled environment, preferably one that has little or no oxygen present, inside the chamber.

When the laser melts or ablates a portion of a stent tube, the melted or ablated debris becomes susceptible to interaction with surrounding substances, which may lead to material embrittlement and low cutting efficiency. One particularly deleterious interaction is an interaction with nearby oxygen molecules. When oxygen is taken up by the stent material, it can lead to material embrittlement, which reduces the material strength and leads to sub-optimal stent performance. Inclusion of a vacuum nozzle that applies vacuum to the stent cutting region and evacuates particulate and debris from the cutting zone reduces the re-cast affect and deposition of melted or ablated material and improves the overall cutting efficiency of the laser cutting station.

Upper tray 130 also includes a gas inlet 145 disposed in a side surface of the upper tray 130. This allows for the use of a shielding gas such as argon during the cutting process.

Another feature of shielding chamber 125 is a cover 140. In some embodiments, cover 140 is opaque. In other embodiments, however, cover 140 may include a sight glass feature to provide a view of the cutting process and also a view of the quantity of stents fabricated by the laser cutting station that have accumulated in lower tray 135.

While particular locations are shown for gas inlet 145 and vacuum port 120, those skilled in the art will understand that other inlet and vacuum port locations may be used without departing from the scope of the invention.

Figure 4:
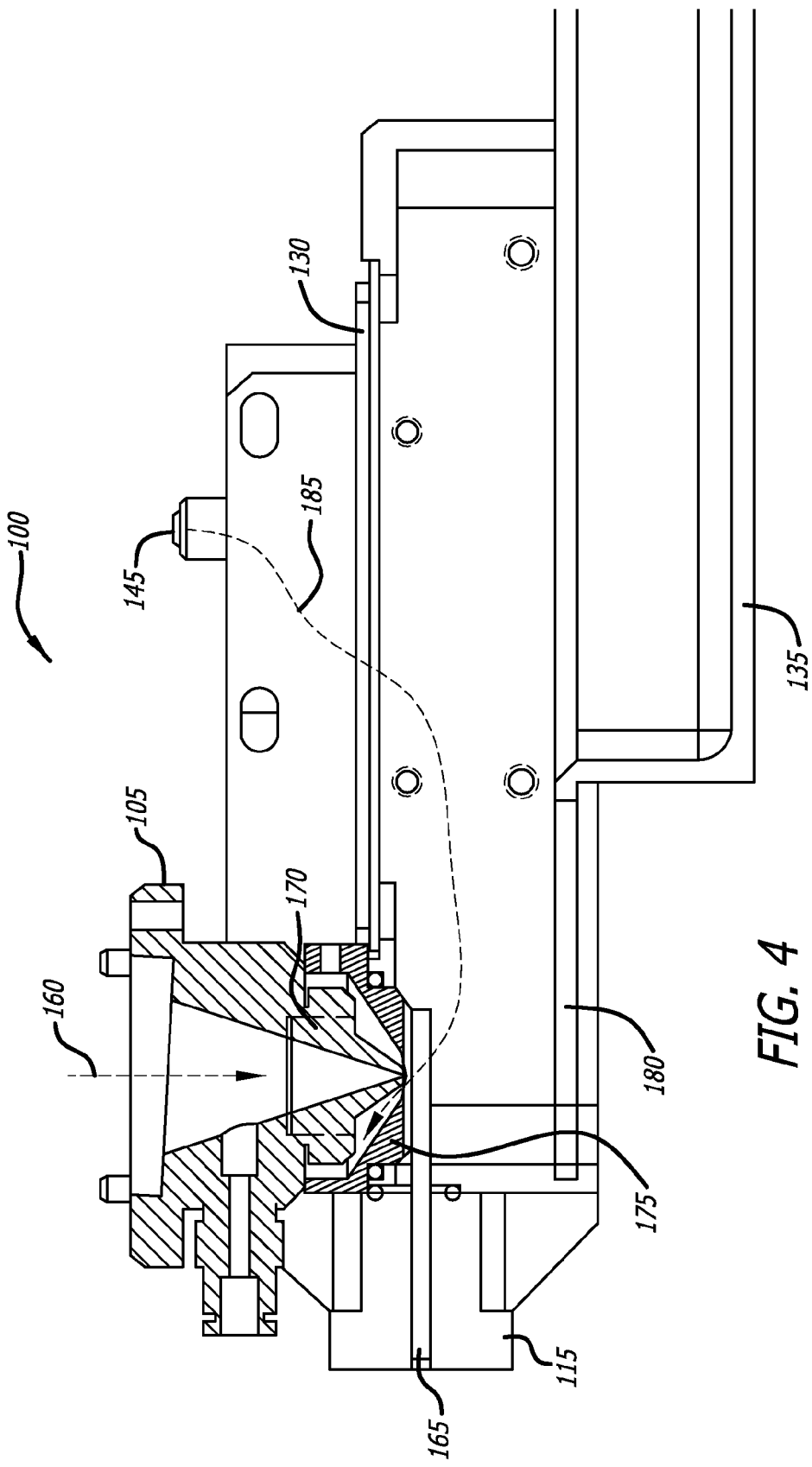
FIG. 4 is a cross-sectional side view of the laser cutting station of FIG. 3.

FIG. 4 is a cross-sectional side view of laser cutting station 100 showing further details of the various components. Similar to FIG. 3, FIG. 4 depicts a laser cutting station 100 that includes an upper tray 130 and lower tray 135. As with FIG. 3, lower tray 135 is shown partially removed from its normal operating location. In the embodiment shown in FIG. 4, lower tray 135 is mounted to upper tray 130 using a track mounting system well known in the art which includes a tray track 180 within which a corresponding lip disposed on lower tray 135 slides.

Also shown in FIG. 4 is a length of stent tubing 165 being held by collet assembly 115. As shown, tubing 165 is held in place under laser nozzle 170 of laser head assembly 105. A laser beam 160 is directed through laser entry port 110 (FIG. 3). The laser beam then passes through laser nozzle 170 to impinge or shine upon stent tubing 165. Also shown in FIG. 4 is a vacuum nozzle 175. A vacuum source may be applied to vacuum nozzle 175 to assist in removal of debris formed while the laser beam is cutting the stent pattern into the stent tubing. As will be further described below, vacuum nozzle 175 may also be used to exhaust the cutting chamber area to remove not only debris from the cutting operation, but also any air or other shielding gas that has been introduced into the cutting chamber.

The upper and lower trays 130, 135 form an enclosed chamber that may be filled with a shielding gas. Typically, the shielding gas will be argon, but is also may be another inert gas. The shielding gas may be introduced through gas inlet 145 in order to fill the chamber and completely surround the stent tubing with shielding gas. The shielding gas will be able to flow within the inside of the stent tubing and therefore prevent oxygen from contacting any surface of the stent tubing that is subjected to heating. Using this arrangement, the risk of material embrittlement may be significantly reduced.

The shielding gas enters gas inlet 145 and then flows through the shielding chamber along gas path 185. As the gas flows through the shielding chamber, it eventually passes over the outer and inner surfaces of the stent tubing 165 being cut by the laser. As it passes over and through stent tubing 165, the gas may be exhausted by applying a vacuum-to-vacuum nozzle 175. Those skilled in the art will understand that the gas path 185 depicted in FIG. 4 is an obvious simplification because the shielding gas would not follow a simple pathway from the inlet to the vacuum port. Gas path 185 simply illustrates the principle that shielding gases continually circulate through the chamber and vacuum nozzle during the laser cutting process. By using such gas flow, contaminants may be removed through the vacuum port during the laser cutting process.

It will be appreciated that the shielding chamber may be formed in many different configurations and shapes. For example, the shielding chamber may have a cylindrical configuration, rather than the rectangular configuration shown in FIGS. 3 and 4. Additionally, other configurations are possible, provided that the configuration creates an enclosed chamber that may be filled with a shielding gas which surrounds the stent tubing and ensures that the entire stent surface is covered by shielding gas during the heating process, and that any debris formed during the laser cutting process can be aspirated from the cutting region along with the shielding gas by a vacuum source applied to the vacuum port.

Figure 5:
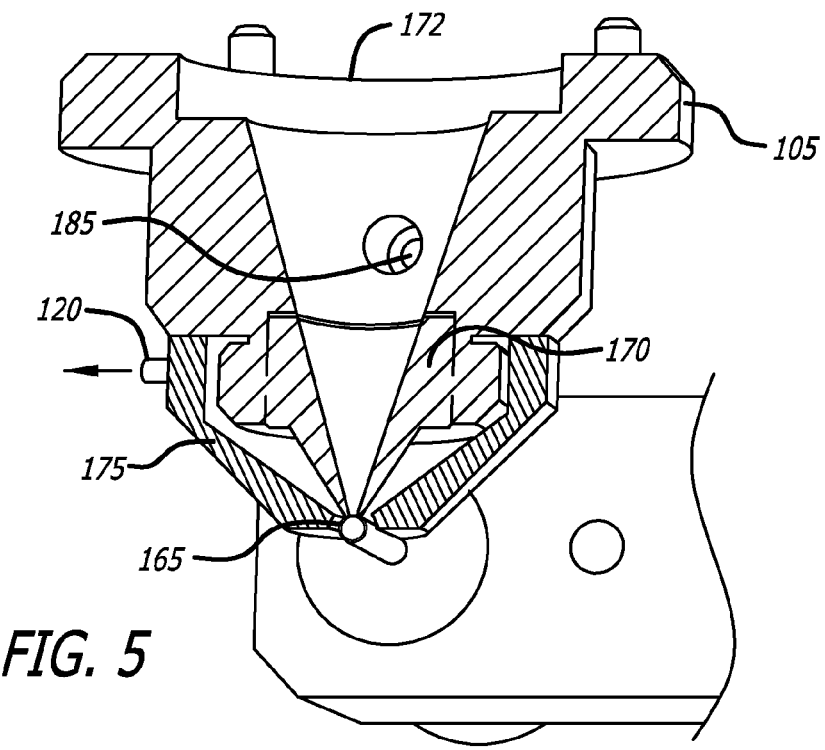
FIG. 5 is a cross-sectional view showing details of an embodiment of a laser nozzle and vacuum nozzle assembly.

Referring now to FIG. 5, a cross-sectional side view of laser head assembly 105 is shown. Laser head assembly 105 includes a laser nozzle 170 surrounded by a vacuum nozzle 175. Laser nozzle 170 and vacuum nozzle 175 are separated by an appropriate clearance forming a channel to allow for the flow of gas within the channel created by the outer surface of the laser nozzle 170 and inner surface of vacuum nozzle 175. This channel provides a volume that is sufficiently small to allow for suction to be applied to the channel in order to produce a fluid flow sufficient for aspirating gas and debris that is just outside of the fluid channel. A vacuum may be attached to vacuum port 120 of vacuum nozzle 175 in order to form the suction required for aspiration.

Referring now to FIGS. 4 and 5, shielding gas is input through shielding gas input port 145 which then flows along gas path 185 until it reaches the laser-cutting zone. In the laser cutting zone, the shielding gas flows over stent tubing 165 and into the channel formed by the outer surface of lens nozzle 170 and the inner surface of vacuum nozzle 175 and then out though vacuum port 125. In this manner, any debris that is formed while the laser beam is cutting stent tubing 165 is carried away by the flow of gas through the channel between the laser nozzle and vacuum nozzle and is then withdrawn using a vacuum source attached to vacuum port 120.

FIG. 5 also depicts an alternative embodiment of a laser head assembly 105 wherein shielding gas enters the cavity formed by laser nozzle 170 through an entry port 185. The shielding gas then flows through the laser nozzle 170 surround laser beam and exits the distal end of laser nozzle 170 to surround the stent tubing 165. As before, the shielding gas is then exhausted through vacuum port 120.

As shown in FIG. 5, the stent tubing 165 is held near a distal end of the laser nozzle 170. A laser beam is directed through a series of laser optics before it is directed through the laser nozzle toward stent tubing 165. The laser beam is typically shielded by a shielding gas, which is typically an inert gas, such as argon. As stated previously, the inert gas may be introduced into the laser nozzle through an entry port 185 located distal to a laser optical lens (not shown) which is inserted into the top surface of laser head assembly 105. In the exemplary embodiment of FIG. 5, the optical lens may rest on a land 172 formed into the top surface of the laser head assembly. The laser optical lens isolates the cutting chamber from the remainder of the laser optical components to prevent contamination of those components by debris formed during the cutting process.

The vacuum nozzle 175 may be formed separately from, or integral with, laser nozzle 170. In a preferred embodiment, the vacuum nozzle 175 is formed separately from laser nozzle 170 and sized and configured to couple with the laser nozzle 170. Vacuum nozzle 175 may be coupled with laser nozzle 170 using a threaded barrel or, alternatively, using set screws that allow the vacuum nozzle 175 to be fit relative to laser nozzle 170. Other possible designs are contemplated that allow for either integral formation of the vacuum nozzle and laser nozzles or attachment of the vacuum nozzle to the laser nozzle that will be immediately obvious to one skilled in the art, and thus will not depart from the scope of the present invention.

Figure 6:
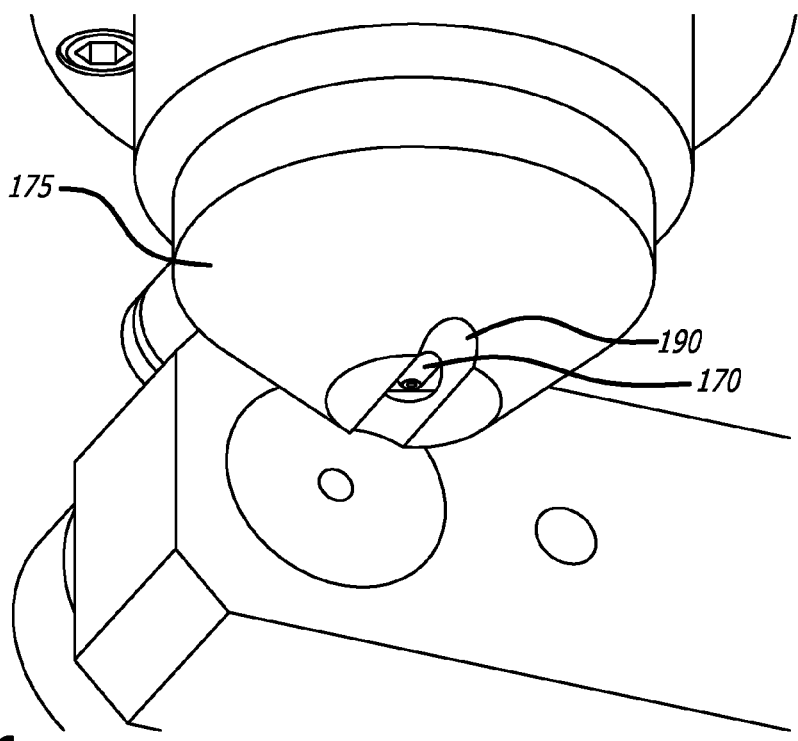
FIG. 6 is a perspective view of the underside of the laser and vacuum nozzle assembly.

Referring now to FIG. 6, vacuum nozzle 175 may also include a recessed portion 190 disposed near a distal tip of the vacuum nozzle 175. Recessed portion 190 is configured to mesh or substantially conform with the stent tubing during laser cutting. For example, recessed portion 190 may have a half-cylindrical shape to conform to the outer surface of the stent tube. In this manner, the suction area around the stent tube can be increased while also maintaining gases and debris as close to the stent surface as possible in order to maximize the aspiration volume being removed. The overall dimensions and configurations of recessed portion 190 will depend upon the design requirements of the particular system being used. However, the configuration and dimensions of recessed portion 190 are variable so long as sufficient suction can be maintained around the stent to ensure removal of gas and debris from the cutting zone.

Figure 7:
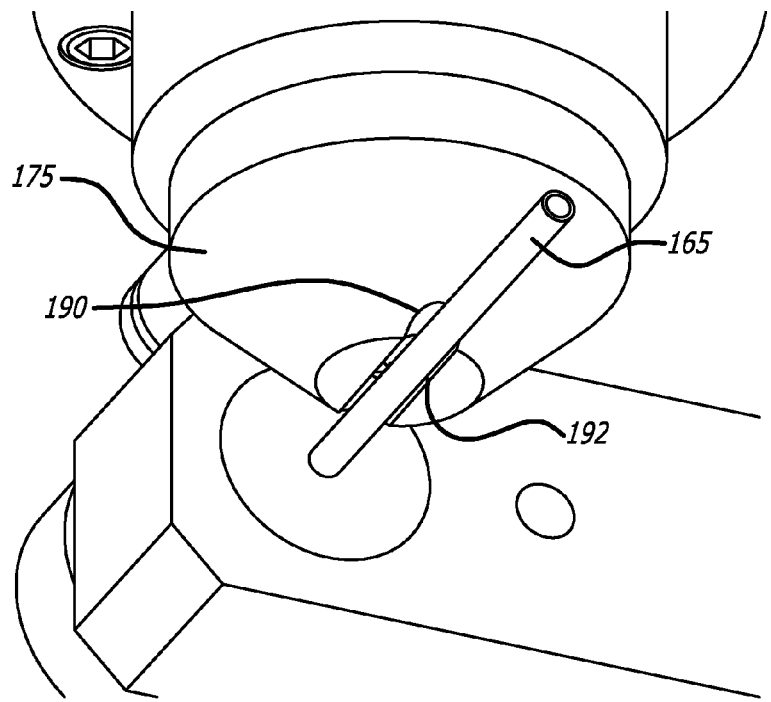
FIG. 7 is a perspective view of the laser and vacuum nozzle assembly of FIG. 6 showing the laser and vacuum nozzle assembly positioned over a length of tubing to be cut with a stent pattern.

FIG. 7 depicts the vacuum nozzle 175 of FIG. 6 showing a stent tube 165 in position below the vacuum nozzle 175. Also depicted is the relationship between stent tube 165 and recess 190 that shows a channel 192 formed between recess 190 and a portion of the stent tube 165. This channel communicates with the channel formed between laser nozzle 170 and vacuum nozzle 175 to provide for aspiration of debris from the cutting zone of the laser and tube.

Figure 8:
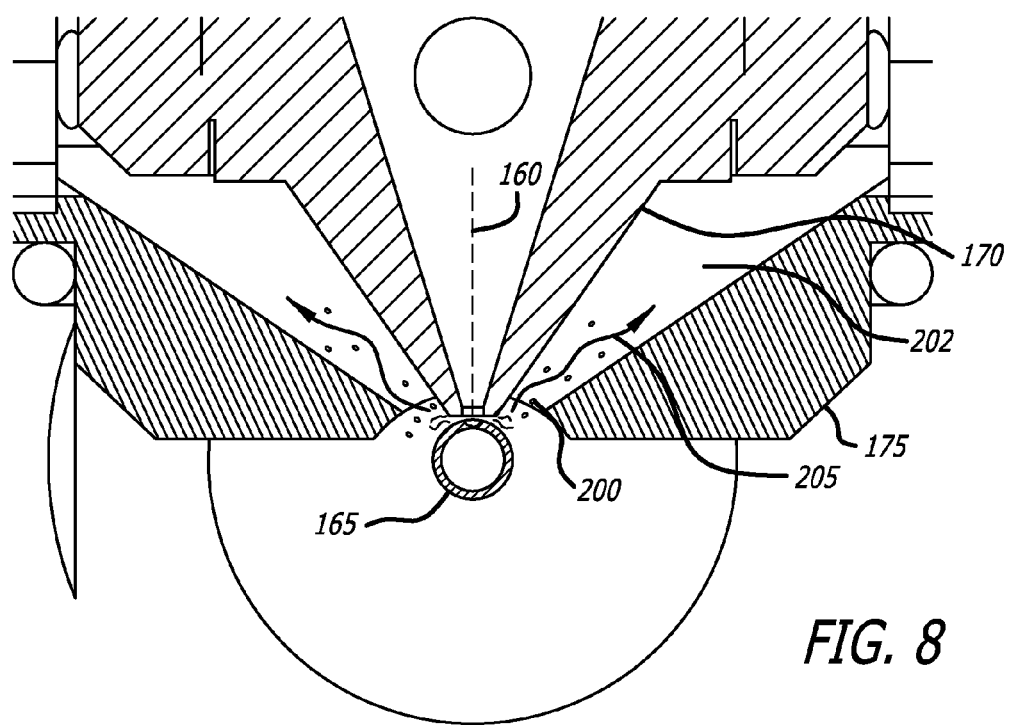
FIG. 8 is a cross-sectional view of the laser and vacuum nozzle assembly of FIG. 6 illustrating the positioning of the laser nozzle and the vacuum nozzle and channels for passage of the laser beam and for transport of cutting debris out of the vacuum nozzle.

FIG. 8 depicts a cross-sectional view of a portion of the lens cutting station near the stent cutting zone. In this exemplary embodiment, stent-tubing 165 is disposed beneath laser nozzle 170 such that a laser beam 160 is directed towards its surface. Laser beam 160 heats the stent tubing above a threshold temperature at which point the stent tubing melts and begins to flow as a result of the shielding gas pressure that encompasses the laser beam. The molten or ablated material may be ejected in the form of particulate debris and can mix with shielding gases and other gases coming from the stent tubing and the surrounding environment. The debris is suctioned into channel 202 and cut debris 200 flows along debris path 205 through channel 202 that is formed by the outer surface of lens nozzle 170 and inner surface of vacuum nozzle 175. Although not shown in FIG. 8, the debris is exhausted through vacuum port 120 in vacuum nozzle 175.

Removal of the debris and gases from the cutting region leads to a reduction in the amount of contaminants that can interact with the stent material if it recasts onto the cut stent. This leads to reduced material embrittlement and, therefore, to improve stent function. The removal of particulates also reduces the inadvertent absorption of laser energy by debris build-up in the cutting area, which increases the energy directed to the intended working part, and thus improves cutting efficiency of the laser beam. Additionally, the removal of contaminants minimizes the chance that debris travels into the laser nozzle and mars the optical lens, thereby reducing laser maintenance requirements and optimizing beam quality.

The various embodiments of the present invention provide numerous advantages over prior art arrangements. For example, incorporation of a vacuum nozzle provides for removal of debris and contaminants from the stent cutting region which minimizes stent contamination caused by recasting, leading to improved stent characteristics and stent performance. Removal of the debris and contaminants from the stent cutting region also helps minimize the likelihood of damage to the laser optics, thus reducing maintenance requirements and improving beam quality. Additionally, the incorporation of a shielding chamber maintains gas shielding on all tube surfaces which minimizes the chance of material embrittlement of the tube. Inclusion of a shielding chamber also provides additional advantages, such as a convenient receptacle for catching cut stents when the cutting process has been completed.

Figure 9:
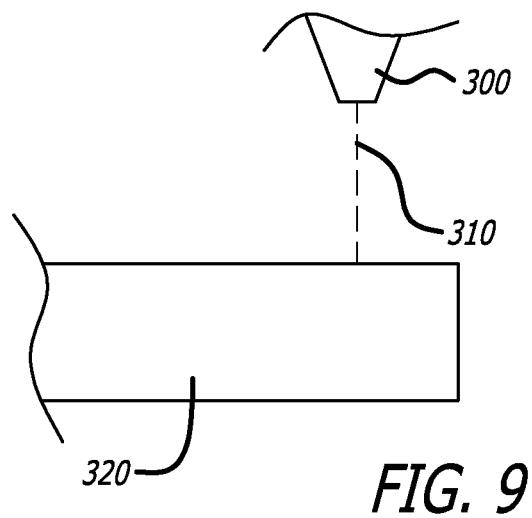
FIG. 9 is a side view showing a typical arrangement of a laser beam being used to cut a stent pattern into a length of tubing.

FIG. 9 illustrates a typical arrangement of a laser 300 generating a laser beam 310 used to cut a stent pattern into the length of stent tubing 320.

Figure 10:
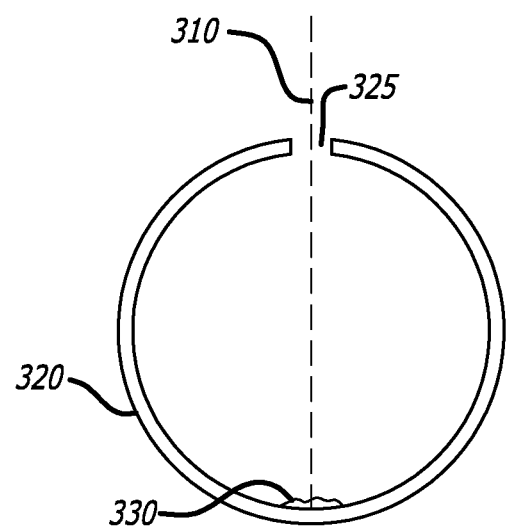
FIG. 10 is a cross-sectional view of the tubing of FIG. 9 showing exemplary damage to the side of tubing opposite to the side being cut by the laser.

FIG. 10 is a cross-sectional view showing the stent tubing 320 of FIG. 9 and also showing how the laser beam 310 has cut away a portion of stent tubing 320 at location 325. Laser beam 310 continues to shine through the gap formed at location 325 by the ablation of the tube by the laser beam and then impinges upon the opposite side of the inner wall of tubing 320. This impingement on the inner wall of tubing 320 causes damage 330 at a location opposite from gap formed at location 115.

Figure 11:
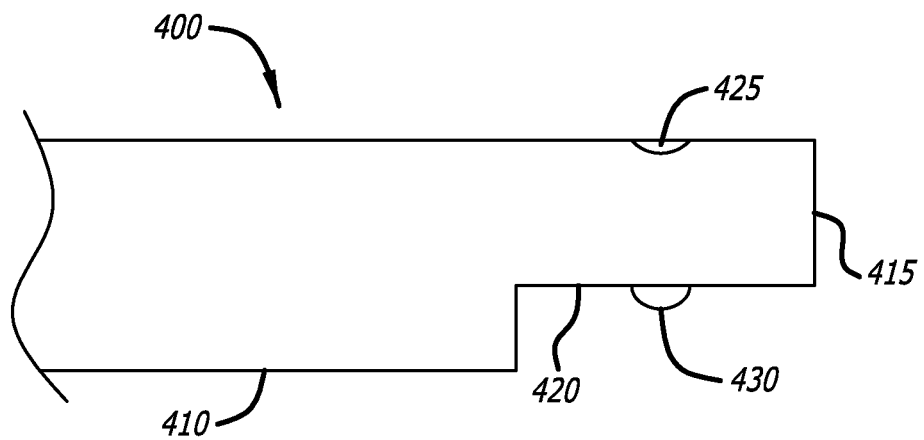
FIG. 11 is side view of one embodiment of a cutting mandrel used during cutting of the tubing by the laser showing the location of an optical element which disperses, scatters or diffuses the laser beam and an exhaust port.

FIG. 11 depicts an illustrative embodiment of a mandrel 400 having a proximal end 410 and a distal tip 415. Located adjacent the distal tip 415 is a recess 420. A channel is bored through mandrel 400 at a location adjacent distal tip 420 of the cutting mandrel 400. An exhaust port 425 defines a top opening of the channel with a dispersion element 430 disposed in a bottom opening of the channel.

In one embodiment, the mandrel is generally cylindrical, and recess 420 adjacent the distal tip 415 of the mandrel is formed with a semi-circular cross-section. The purpose for this geometry is that the stent tubing is intended to fit closely around the cylindrical geometry of the mandrel, but there must be a clearance between the stent tubing and the dispersion element at the distal tip 415 of the mandrel where the cutting of the tubing by the laser beam takes place. This recess 420 allows a laser beam entering port 425 after cutting the area of tubing overlaying port 425 pass to through the channel through dispersion element 430 and to diverge or disperse after the beam exits the dispersion element 430 and before it reaches the inner wall of the stent tube that surrounds the mandrel.

The recessed distal portion 420 of the cutting mandrel 400 maybe formed in a number of ways. For example, the distal tip 415 of the mandrel may be ground or laser cut to create the semi-circular shape. Those skilled in the art will understand that other shapes are possible, provided that the distal tip is formed in such a manner as to provide for sufficient clearance between the inner wall of the stent tubing and the dispersion element 150.

Dispersion element 430 may simply be an opening of the channel that is formed through the mandrel allowing the laser beam to pass through the mandrel. The channel is necessary to prevent ablation of the mandrel by the laser beam. Ablation of the mandrel by the laser beam is undesirable in that contamination of the stent by the ablated mandrel material would result. Alternatively, dispersion element 430 may be a lens configured to spread the laser beam through greater angle than would occur through natural beam dispersion alone.

The mandrel may be formed from a variety of materials, such as various types of stainless steels, tool steels, alloy steels, aluminum, bronze and brass that are temperature and abrasion resistant, and having a reasonably high modulus to remain relatively inflexible at the small diameters required for insertion into the stent tubing. Ceramic materials, as well as thermoset plastics having acceptable temperature and abrasion resistance, may also be used.

Figure 12:
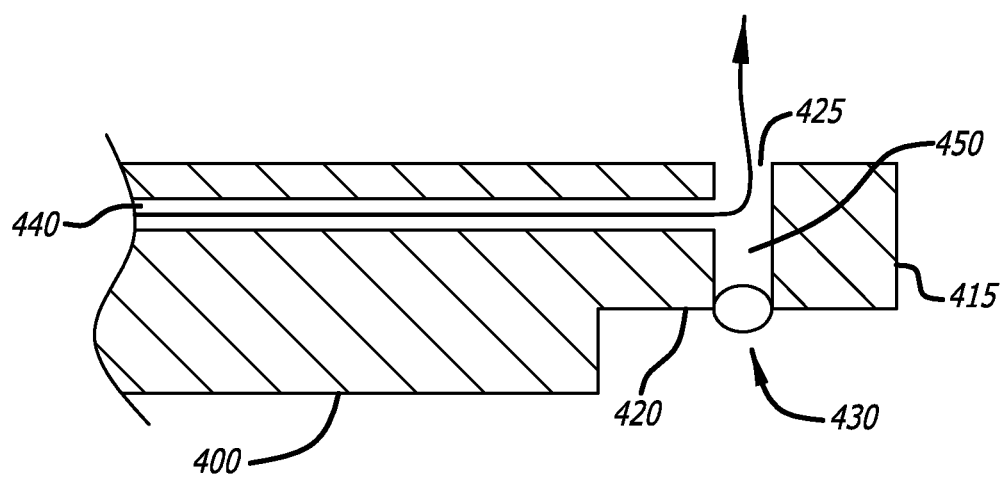
FIG. 12 is a cross-sectional view of the cutting mandrel of FIG. 11 showing a channel for providing gas flow through the mandrel and out of the exhaust port and the position of the dispersion element bonded in place in the mandrel.

FIG. 12 illustrates the cutting mandrel 400 of FIG. 11 in more detail and provides a cross-sectional view of the various features of the mandrel 400. Axial channel 440 is bored through the mandrel along the axis of the mandrel, which allows for a shielding gas such as argon, nitrogen, or helium, to be delivered from the proximal end 410 of the mandrel to the distal end 415 of the mandrel. Axial channel 142 intersects with transverse channel 450. Transverse channel 450 is formed in the mandrel adjacent the distal end 415 of the mandrel. Exhaust port 425 defines one end of the transverse channel 450, with a second opening of the transverse channel disposed on an opposite side of the mandrel. Exhaust port 145 in the transverse channel 450 is intended to be aligned with the laser beam when in use. Thus, one of the openings in the mandrel surface that the channel creates will allow the laser beam to enter into the mandrel and the other opening will allow the laser beam to exit the mandrel.

The channels that are located within the cutting mandrel permit a shielding gas such as Argon to be flowed toward the cutting area of the mandrel. The shielding gas enters axial channel 440 at the proximal end 410 of the mandrel and flows through the mandrel until channel 440 intersects with transverse channel 450, whereupon the shielding gas flows through transverse channel 450 and out exhaust port 425. This provides at least two advantages, first, the shielding gas flow removes particulate from the cutting zone and minimizes the amount of debris that may fall through transverse channel 450 to fall upon dispersion element 430. Thus, this arrangement reduces contamination of dispersion element 430, prolong mandrel life and reducing maintenance of the mandrel, while also reducing contamination, the cut surface of the tube. Additionally, the gas flow through transverse channel 450 reduces build up of contamination and debris in and around exhaust port 425. Moreover, the flow of shielding gas on the cut surface of the stent tubing further reduces the risk of, for example, oxygen uptake by the stent tube as it is cut by the laser, which may reduce the risk of material embrittlement in some stent materials.

When the laser beam enters the exhaust port 425, and passes through the mandrel, the laser beam ultimately passes through the dispersion element 430, which may be a lens or glass ball, as it exits the mandrel. When the laser beam interacts with dispersion element 430, the laser beam is dispersed or diffracted and thus contacts a larger surface area of the inner wall of the stent tube 320 than would be the case if the laser beam did not pass through the dispersion element 430.

Dispersion element 430 may have several geometries in accordance with the present invention. For example, the dispersion element 430 may be a lens that is either convex or concave. In one embodiment, the lens is spherically shaped. The lens may be formed from a number of materials, but it is contemplated that materials that are hard and optically transmissive are ideal for this purpose. For example, an optical glass may be a suitable material for the lens. Although the terms "dispersing," "divergent," or "diffracting," may be used interchangeably throughout this description, one skilled in the art will understand that a converging lens can also be used to cause the laser beam to be spread out or "diverge" before the beam contacts the wall opposite the side of the tube being cut.

Figure 13:
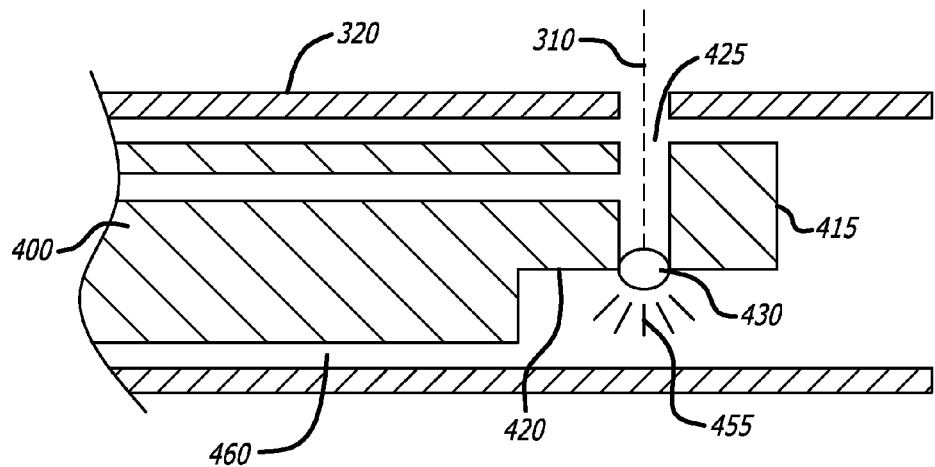
FIG. 13 is a cross-sectional view showing a length of tubing disposed on the cutting mandrel of FIG. 12 showing the exhaust port of the mandrel positioned adjacent the area of the tube being cut by the laser and showing how gas flows through the exhaust port into the region being cut while the dispersing element disperses, scatters or diffuses the laser beam to avoid unwanted tubing damage.

FIG. 13 further illustrates one embodiment showing how a stent tube 320 fits around mandrel 400 and the arrangements of the various elements of the mandrel in relation to the stent tube 320 when a laser beam 310 is being used to cut a stent pattern into the tube. FIG. 13 also illustrates how laser beam 310 cuts a pattern into a sidewall of a tube 320 and then passes through the opening cut by the laser into the lumen of the tube. Laser beam 310 then passes through exhaust port 425 and ultimately through dispersion element 430 where the beam is dispersed into a much larger diameter, as indicated by reference numeral 455, so that when it impacts the inner wall of tube 320 the intensity of the laser light is greatly reduced, thus preventing burning or damaging to the inner wall of tube 320 opposite the location of the tube being cut.

Tube 320 and mandrel 400 are positioned so that there is a gap 460 between mandrel 400 and tube 320 along the side of mandrel 400 in which is located recess 420. Gap 460 ensures there is enough distance between the dispersion element 430 and the inner wall of tube 320 opposite the side of the tube being cut to allow for sufficient divergence or dispersion of the beam before it reaches the inner wall of the tube. It will also be understood that while there may be a gap between the mandrel and the inner wall of the side of the tube being cut by laser beam 310, there may also be a close fit between the mandrel and the tube. While gap 460 is preferable, it is not necessary provided that the recess 420 formed into the distal tip of the mandrel 400 is deep enough to allow sufficient clearance to provide for proper dispersion of the laser beam as it passes through dispersion element 430.

The clearance between the cutting mandrel 400 and tubing 320 should be sufficient to prevent the mandrel from interfering with the movement of the tubing, which is manipulated, as described previously, by a computer controlled movement device or assembly. It will be appreciated that because of the small size and relative flexibility of the tubing, there may be surface contact between the mandrel and tubing at various locations. The surface contacts should be minimized so that they do not significantly interfere with the relative motion between the components. In some embodiments of the present invention with a close fit and rigid mandrel positioning, the surface contacts between the mandrel and tubing may compensate for a lack of straightness in the tubing material, causing a portion of the tube being cut to be confined to a position or position range that is optimal for the cutting beam and to assure better control of stent strut dimensions. This clearance may be in the range of a few micrometers to a few millimeters. Preferably this gap will be in a range of between about 10 micrometers to 0.5 millimeters.

Figure 14:
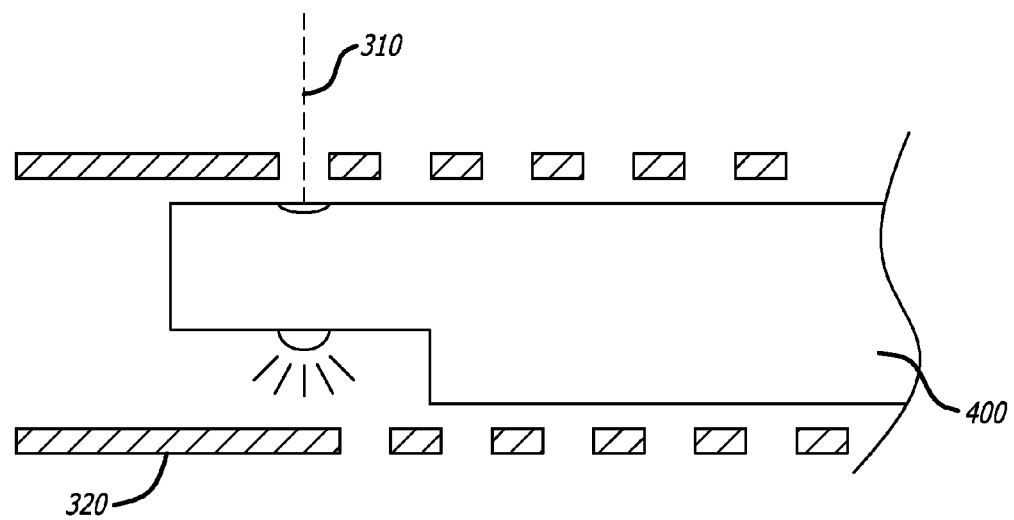
FIG. 14 is a cross-sectional view of another embodiment of the cutting mandrel showing the mandrel inserted into the tube with the tube being translated relative to the mandrel in a direction distal to the location of the exhaust port and dispersion element.

The embodiment of the mandrel shown in FIG. 13 illustrates that the stent tubing may be advanced over the cutting mandrel from a proximal location to a distal location. It will be understood, however, that the invention is not so limited. FIG. 14, for example, depicts an embodiment wherein the stent tubing is advanced over the cutting mandrel such that the stent tubing will have cut portions of the tubing located distal to the laser beam.

Figure 15:
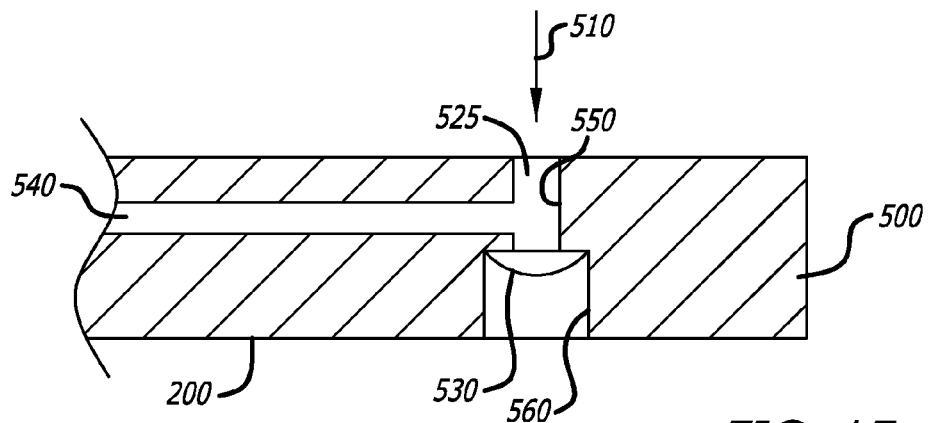
FIG. 15 is a cross-sectional view of another embodiment of a cutting mandrel showing a dispersion element mounted in a counter-bore that is larger in diameter than the exhaust port.

FIG. 15 illustrates an alternative embodiment of the cutting mandrel 500 where the entire length of cutting mandrel 500 may be generally cylindrical. A transverse channel 550 is cut into a top surface of the cylinder and extends through the cutting mandrel to the other side of the cylinder. As before, the mandrel may include axial channel 540 to allow for the entry of a shielding gas that then flows through channel 540 and out one side of channel 550 through exhaust port 525. A dispersion element or lens 530 is disposed within a counter-bore 560 disposed in a side of the cylinder opposite from exhaust port 525. This counter-bore extends transversely into the mandrel for a distance sufficient to allow for dispersion of a laser beam that has passed through dispersion element 530. The depth of counter-bore 560 is selected to ensure that counter-bore 560 does not interfere with axial channel 540, ensuring that gas passing through axial channel 540 may exit an exhaust side of channel 550. Counter-bore 560 thus provides adequate separation between dispersion element 530 and the tubing wall (not shown) to allow the laser beam 510 to diverge or disperse before contacting the inner wall of the tube that surrounds mandrel 500.

Figure 16:
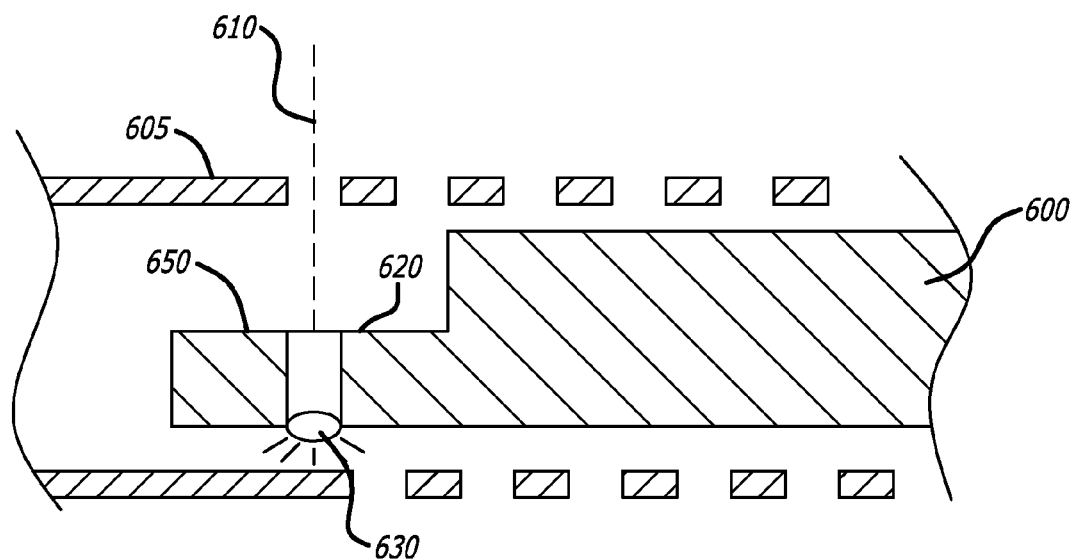
FIG. 16 is a cross-sectional view of another embodiment of a cutting mandrel.

FIG. 16 shows yet another embodiment of a cutting mandrel 600 wherein the cutting mandrel is rotated 180 degrees from the embodiments discussed above. In this configuration, the recess 620 of mandrel 600 is disposed such that the clearance between the cutting side and the recess is located adjacent the side of tubing 610 being cut by laser beam 610. However, this embodiment requires sufficient clearance between the underside of mandrel 600 and the opposite wall of tubing 605 to ensure proper dispersion of laser beam 610 after passing through the dispersion element 630 disposed in the underside of recess 620.

The cutting mandrels of the various embodiments of the present invention may be formed from various materials that have sufficient stiffness and resistance to laser melting or ablation. For example, graphite, glass, aluminum oxide, or other ceramics may be used for forming the cutting mandrel. The cutting mandrel may also be formed from a metal or polymer that resists laser cutting yet provides the desired mechanical and material characteristics.

The various embodiments of the cutting mandrel described above are advantageous in that they provide for diffraction or dispersion of the laser beam that prevents the beam from melting or otherwise damaging the inner surface of tubing used to form a stent. Channels formed within the cutting mandrel allow for the introduction of a shield gas within the inner diameter of a length of tubing used to form a stent and may reduce material embrittlement, material oxidation, or other undesired effects due to stent material heating and/or exposure to certain gases. Introduction of a shielding gas also keeps the dispersion element, which may be a lens, and the channels clean and free from particulate and other matter that is generated during the laser cutting process. Additionally, a close fit between the cutting mandrel and the inner wall of the tube being cut into a stent may compensate for a lack of tube straightness and thus improves laser cutting efficiency and stent strut dimensional control.

It will be apparent from the foregoing that the present invention provides a new and improved method and apparatus for direct laser cutting of metal stents enabling greater precision, reliability, structural integrity and overall quality, without burrs, slag or other imperfections which might otherwise hamper stent integrity and performance. Other modifications and improvements may be made without departing from the scope of the invention. Accordingly, it is not intended that the invention be limited, except as by the appended claims.

We claim:

1. A laser cutting system, comprising:
   a laser source for providing a laser beam; and
   a chamber for maintaining a controlled environment, the chamber having an optical element disposed in one surface of the chamber for allowing access by the laser beam to an internal volume of the chamber, the chamber also having an input port and an exhaust port;
   a fixture for holding an article to be cut by the laser beam, the fixture disposed within the chamber;
   a laser nozzle through which the laser beam shines to fall upon the article held by the fixture, the laser nozzle having an opening disposed at a distal end of the nozzle and located adjacent the fixture such that the laser beam exits the opening to fall upon the article held by the fixture;
   a vacuum nozzle disposed around the laser nozzle and positioned adjacent the fixture such that a first opening disposed at a distal end of the vacuum nozzle at least partially surrounds the article to be cut without touching the article to be cut; and
   a channel defined by an outer surface of the laser nozzle and an inner surface of the vacuum nozzle, the channel in fluid communication with the first opening of the vacuum nozzle and the exhaust port such that gas flowing through the input port into the chamber is drawn over the article to be cut and into the first opening and through the channel by a vacuum source applied to the exhaust port.

2. The system of claim 1, wherein the first opening of the vacuum nozzle includes a recess configured to surround a portion of the article to be cut.

3. The system of claim 2, wherein the article to be cut is a tube and the recess has a semi-circular shape.

4. The system of claim 1, wherein the chamber is defined by a fixed tray and a movable tray, the movable tray having an open position and a closed position, the chamber effective to form a closed volume when the movable tray is in the closed position.

5. The system of claim 1, wherein the input port is configured to receive a shielding gas.

6. A laser cutting system, comprising:
   a laser source for providing a laser beam; and
   a chamber for maintaining a controlled environment, the chamber having an optical element disposed in one surface of the chamber for allowing access by the laser beam to an internal volume of the chamber, the chamber also having an input port and an exhaust port;
   a fixture for holding an article to be cut by the laser beam disposed within the chamber, the fixture including a mandrel for supporting the article to be cut while the article is cut by the laser beam;
   a laser nozzle through which the laser beam shines to fall upon the article held by the fixture, the laser nozzle having an opening disposed at a distal end of the nozzle and located adjacent the fixture such that the laser beam exits the opening to fall upon the article held by the fixture;
   a vacuum nozzle disposed around the laser nozzle and positioned adjacent the fixture such that a first opening disposed at a distal end of the vacuum nozzle at least partially surrounds the article to be cut without touching the article to be cut; and
   a channel defined by an outer surface of the laser nozzle and an inner surface of the vacuum nozzle, the channel in fluid communication with the first opening of the vacuum nozzle and the exhaust port such that gas flowing through the input port into the chamber is drawn over the article to be cut and into the first opening and through the channel by a vacuum source applied to the exhaust port.

\* \* \* \* \*

UNITED STATES PATENT AND TRADEMARK OFFICE
CERTIFICATE OF CORRECTION

PATENT NO. : 8,530,783 B2
APPLICATION NO. : 12/699262
DATED : September 10, 2013
INVENTOR(S) : Rodney C. Ow et al.

Page 1 of 1

It is certified that error appears in the above-identified patent and that said Letters Patent is hereby corrected as shown below:

In the Specification

Column 3, line 22, between "changes" and "the" insert --of--.
      line 46, between "debris" and "other" insert --and--.

Column 11, line 50, between "from" and "gap" insert --a--.

Column 12, line 13, after "element" delete "150" and insert instead --430--.
      line 22, between "through" and "greater" insert --a--.
      line 61, after "element 430," delete "prolong" and insert instead --prolongs--.
      line 62, between "and" and "maintenance" delete "reducing" and insert instead --reduces--.
      line 63, between "contamination," and "the" insert --of--.

Signed and Sealed this
Seventeenth Day of June, 2014

Michelle K. Lee
*Deputy Director of the United States Patent and Trademark Office*